Jan. 10, 1933.    S H H. KUENZEL    1,894,103
CONVERTIBLE VEHICLE BODY
Filed May 18, 1931    2 Sheets-Sheet 1
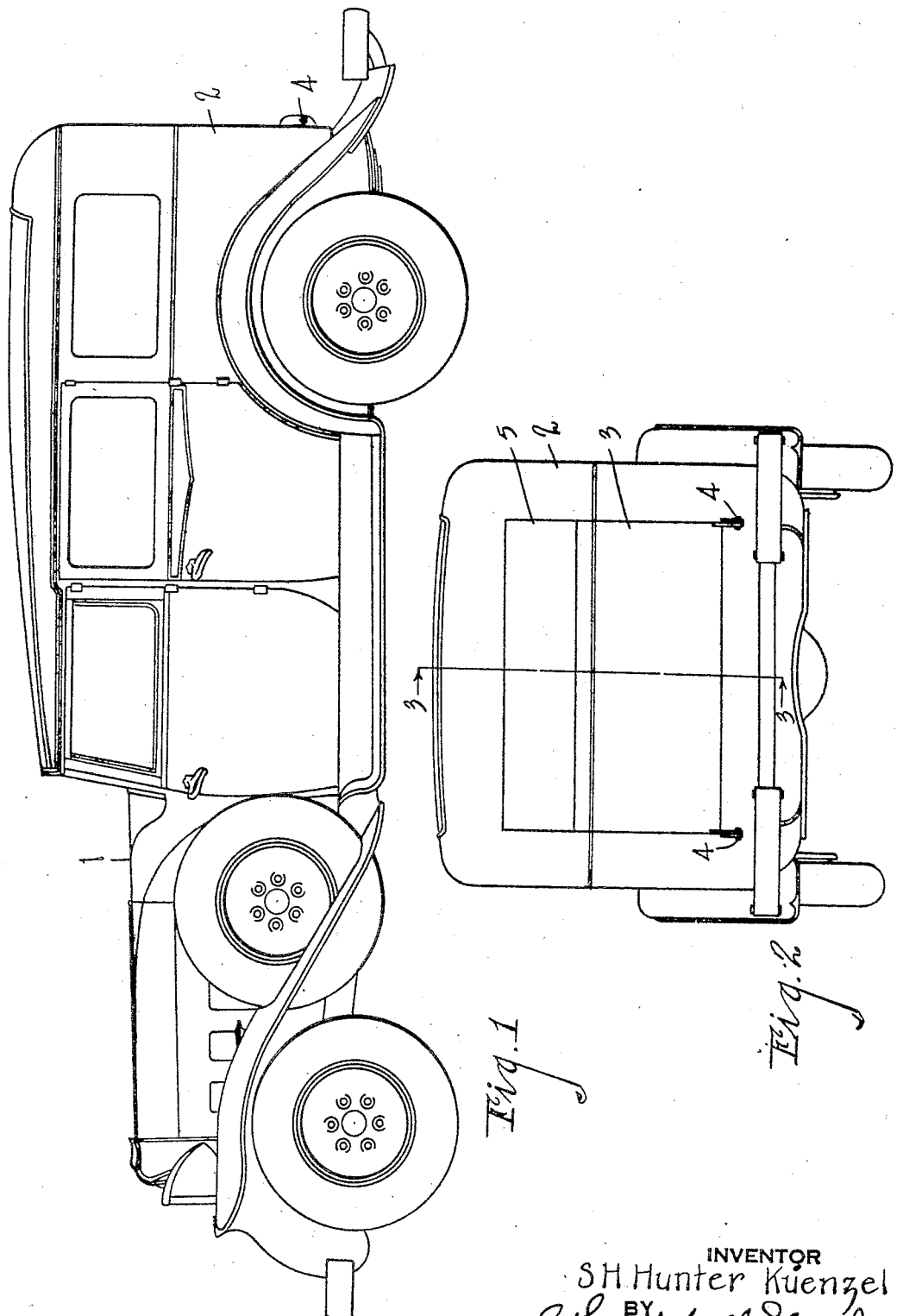
INVENTOR
S.H. Hunter Kuenzel
BY
Chappell & Earl
ATTORNEYS Jan. 10, 1933. S H H. KUENZEL 1,894,103
CONVERTIBLE VEHICLE BODY
Filed May 18, 1931 2 Sheets-Sheet 2

INVENTOR
S H Hunter Kuenzel
BY
Chappell Earl
ATTORNEYS

Patented Jan. 10, 1933

1,894,103

UNITED STATES PATENT OFFICE

S H HUNTER KUENZEL, OF KALAMAZOO, MICHIGAN, ASSIGNOR TO CHECKER CAB MANUFACTURING CORPORATION, OF KALAMAZOO, MICHIGAN

CONVERTIBLE VEHICLE BODY

Application filed May 18, 1931. Serial No. 538,045.

The object of the invention is to provide a vehicle body with means whereby it may be easily adjusted to an all-passenger type, a semi-passenger, semi-delivery type or a delivery type, as desired.

Another object of the invention is to provide a passenger vehicle with means for carrying a large amount of luggage therein as well as passengers.

A still further object of the invention is to provide a convertible vehicle body which is simple and economical to manufacture, and one that utilizes available space to the best possible advantage.

Further objects of the invention will be apparent from the specification and drawings, in which:

Fig. 1 is a view in side elevation of a motor vehicle embodying my invention.

Fig. 2 is a rear elevation of the vehicle illustrated in Fig. 1.

Figure 3:
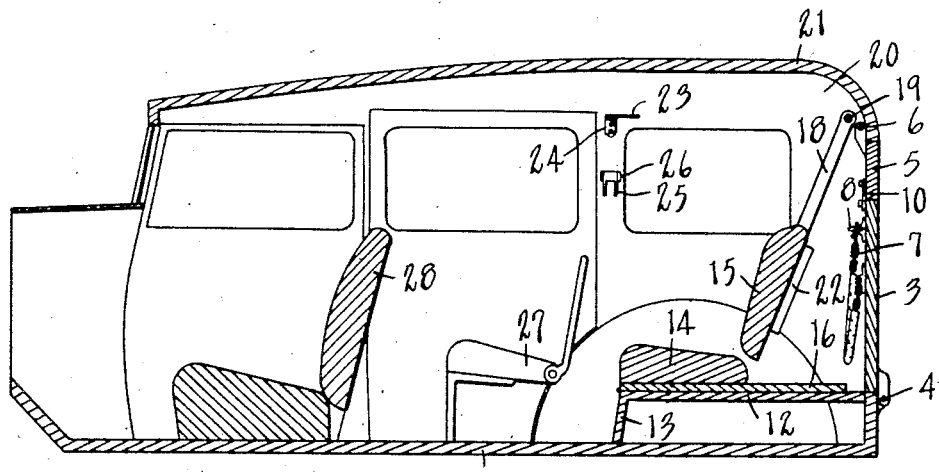
Fig. 3 is a fragmentary vertical section on line 3—3 of Fig. 2.

Referring to the drawings, numeral 1 designates a motor vehicle such as a taxicab of the conventional type having a body 2 provided with a tail gate panel 3 hinged thereto at 4 and having a transom 5 hinged thereto at 6. The transom 5 is adapted to be swung outwardly and the tail gate panel 3 is adapted to be swung outwardly from the rear wall of the body.

Figure 5:
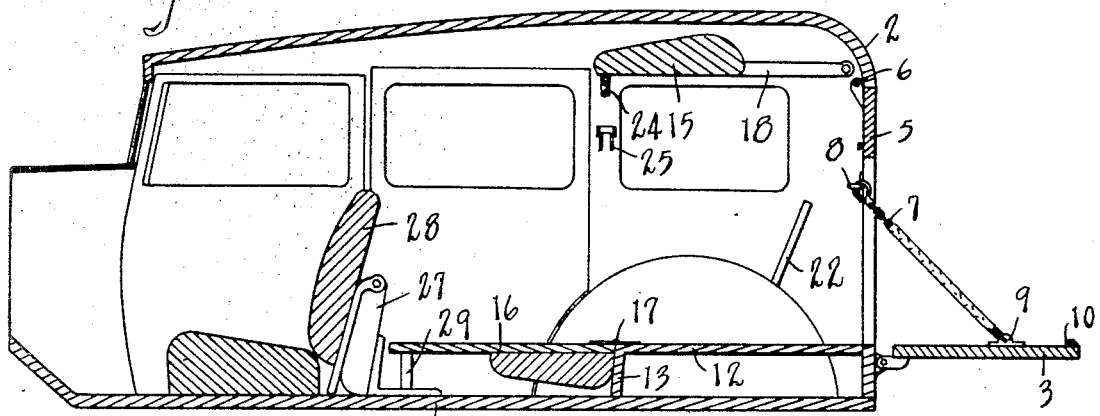
Fig. 5 is a view similar to Fig. 3 showing the tail gate panel open and the rear seat bottom adjusted to a position adjacent the floor of the body providing additional storage space.

A supporting chain 7 having one end connected to a bracket 8 secured to the body 2 and the other end connected to a bracket 9 mounted on the inside of the panel 3 limits the outward movement of the panel 3, as shown by Fig. 5. A latch 10 is provided to releasably secure the panel 3 in its closed position.

The floor 11 of the body 2 is provided with a raised deck 12 at the rear thereof and supported by an upright 13 provided under its forward edge. The rear edge of the deck or sub-floor 12 is secured to the back wall of the body adjacent the lower edge of the panel 3.

A rear seat is provided in the body 2 consisting of a bottom 14 and a back 15. The bottom 14 is carried by a panel member 16 which is hinged at its rear edge to the forward edge of the deck 12 by hinges 17.

The back 15 is carried by arms 18 which are pivoted at 19 to the sides 20 of the body 2 near the top deck 21 thereof. Support or stop members 22 are secured to the sides 20 of the body for limiting the downward movement of the back 15. When the back 15 is swung to inoperative position as shown by Figs. 4 and 5, it may be secured in such position by swinging latches 23 pivoted to brackets 24 on the sides 20 of the body.

Figure 4:
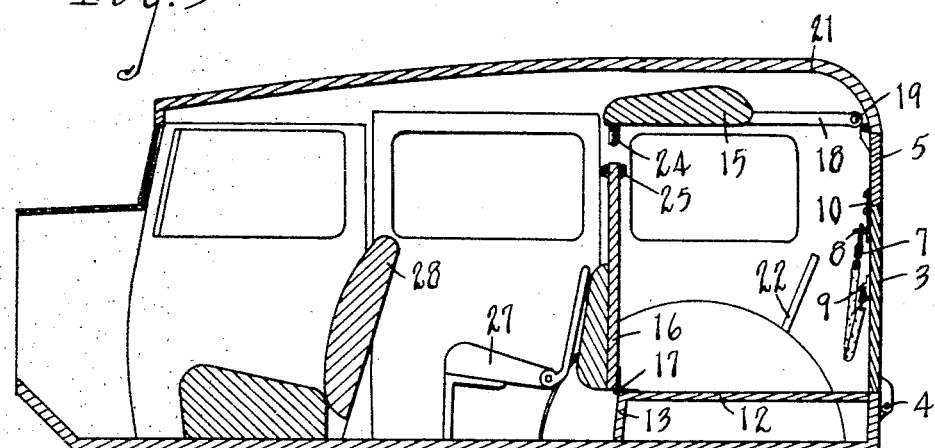
Fig. 4 is a view similar to Fig. 3 showing the back and bottom of the rear seat swung to horizontal and vertical positions respectively to provide storage space in the rear of the vehicle.

The seat panel 16 is adapted to be swung through an angle of 180° but U-shaped latches 25 are horizontally pivoted to brackets 26 mounted on the body for releasably securing the member 16 in a vertical position as shown by Fig. 4.

The vehicle is provided with a plurality of conventional type collapsible seats 27 mounted on the floor 11 between the rear seat and the front seat 28. When it is desired to turn the seat panel 16 to the position shown by Fig. 5, the intermediate seats 27 are collapsed and folded so as to lie adjacent the front seat 28 as shown by Fig. 5. The panel 16 may then be adjusted to the position shown in Fig. 5 in the plane of the deck 12 and forms a continuation thereof. Supporting members 29 are provided for supporting the front end of the member 16 in this position. The supporting members 29 may be conveniently pivoted in recesses provided therefor in the floor 11 so that they are out of the way when not in use. The space between the member 16 and the floor 11 is preferably such that the seat 14 does not rest on the floor 11 when the member is turned to the position shown in Fig. 5.

With the seat parts 14 and 15 adjusted to the positions shown by Fig. 4, it will be obvious that a space is provided in the back of the body 1 which is capable of accommodating trunks, bags and the like. Access to this space is through the gate panel 3. If the size of the opening afforded by opening the panel 3 is too small for excessively large baggage, the transom 5 may be swung open. Where a considerable amount of baggage is to be carried by the vehicle or it is desired to use the vehicle for delivery or trucking purposes, then the seats may be adjusted to the positions they occupy in Fig. 5.

While I have illustrated and described a preferred embodiment of the invention, it is to be understood that the same may be modified without departing from the spirit of the invention which is to be limited only by the prior art and the scope of the following claims.

Having thus described my invention, what I claim as new and desire to secure by Letters Patent, is:

1. A passenger vehicle body having an opening in the rear thereof and a closure therefor adapted as a tail gate, a transom member above said tail gate hinged at its upper edge, a raised floor deck in the rear portion of the body, a panel-like rear seat bottom member hinged to the forward edge of said deck to rest thereon or to be swung forwardly to an inverted horizontal position to constitute a continuation for said deck, means for supporting said rear seat member in such horizontal position in spaced relation to the floor of the vehicle, a rear seat back member provided with upwardly projecting supporting arms pivoted adjacent the top of the vehicle body so that said back member may be swung to operative relation to the seat bottom when it is adjusted as a seat or swung upwardly to a position adjacent the top of the body, and means for securing said rear seat bottom in a vertical position.

2. A passenger vehicle body having an opening in the rear thereof and a closure therefor adapted as a tail gate, a raised floor deck in the rear portion of the body, a panel-like rear seat bottom member hinged to the forward edge of said deck to rest thereon or to be swung forwardly to an inverted horizontal position to constitute a continuation for said deck, means for supporting said rear seat member in such horizontal position in spaced relation to the floor of the vehicle, a rear seat back member provided with upwardly projecting supporting arms pivoted adjacent the top of the vehicle body so that said back member may be swung to operative relation to the seat bottom member when it is adjusted as a seat or swung upwardly to a position adjacent the top of the body, and means for securing said rear seat bottom member in a vertical position.

3. A passenger vehicle body having an opening in the rear thereof and a closure therefor adapted as a tail gate, a transom member above said tail gate hinged at its upper edge, a raised floor deck in the rear portion of the body, a panellike rear seat bottom member hinged to the forward edge of said deck to rest thereon or to be swung forwardly to an inverted horizontal position to constitute a continuation for said deck, a rear seat back member provided with upwardly projecting supporting arms pivoted adjacent the top of the vehicle body so that said back member may be swung to operative relation to the seat bottom member when it is adjusted as a seat or swung upwardly to a position adjacent the top of the body, and means for securing said rear seat bottom member in a vertical position.

4. A passenger vehicle body having an opening in the rear thereof and a closure therefor adapted as a tail gate, a raised floor deck in the rear portion of the body, a panel-like rear seat bottom member hinged to the forward edge of said deck to rest thereon or to be swung forwardly to an inverted horizontal position to constitute a continuation for said deck, a rear seat back member provided with upwardly projecting supporting arms pivoted adjacent the top of the vehicle body so that said back member may be swung to operative relation to the seat bottom member when it is adjusted as a seat or swung upwardly to a position adjacent the top of the body, and means for securing said rear seat bottom member in a vertical position.

5. A passenger vehicle body having an opening in the rear thereof and a closure therefor adapted as a tail gate, a raised floor deck in the rear portion of the body, a panel-like rear seat bottom member hinged to the forward edge of said deck to rest thereon or to be swung forwardly to an inverted horizontal position to constitute a continuation for said deck, a rear seat back member adjustably mounted so that it may be swung to operative relation to the seat bottom member when it is adjusted as a seat or to a position adjacent the top of the body, and means for securing said rear seat bottom member in a vertical position.

6. In a vehicle body, a rear seat comprising a back member pivoted at the top thereof whereby it may be swung upwardly and secured adjacent the ceiling of the body, a bottom member hinged at its lower edge whereby it may be swung to and secured in an upright position or swung through an angle of 180 degrees so as to rest on the floor of the body, the rear end of said body having a tail panel, and a hinged transom above said panel.

In witness whereof I have hereunto set my hand.

S H HUNTER KUENZEL.